United States Patent
Moscetti

(10) Patent No.: US 9,574,458 B1
(45) Date of Patent: Feb. 21, 2017

(54) BI-ROTATIONAL THRUST BEARING FOR A TURBOCHARGER

(71) Applicant: BorgWarner Inc., Auburn Hills, MI (US)

(72) Inventor: Jason Moscetti, Hendersonville, NC (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/089,995

(22) Filed: Apr. 4, 2016

(51) Int. Cl.
*F16C 32/06* (2006.01)
*F01D 25/16* (2006.01)
*F01D 25/18* (2006.01)

(52) U.S. Cl.
CPC ........... *F01D 25/162* (2013.01); *F01D 25/18* (2013.01); *F16C 32/0651* (2013.01); *F05D 2220/40* (2013.01); *F05D 2240/52* (2013.01); *F16C 2360/24* (2013.01)

(58) Field of Classification Search
CPC .... F16C 17/04; F16C 17/047; F16C 33/1075; F16C 2360/24
See application file for complete search history.

(56) References Cited

U.S. PATENT DOCUMENTS

| | | | |
|---|---|---|---|
| 4,141,603 A | 2/1979 | Remmers et al. | |
| 4,765,760 A * | 8/1988 | Heshmat | F16C 33/1075 384/398 |
| 5,393,145 A | 2/1995 | Ide | |
| 5,529,399 A * | 6/1996 | Holze | F16C 17/10 384/107 |
| 5,556,208 A | 9/1996 | Ide | |
| 6,045,266 A | 4/2000 | Mitsubori et al. | |
| 6,746,152 B2 | 6/2004 | Branagan | |
| 6,827,494 B2 | 12/2004 | Aguilar | |
| 6,929,402 B1 * | 8/2005 | Titus | F16C 17/10 384/107 |
| 7,354,199 B2 * | 4/2008 | Welch | F16C 9/00 384/275 |
| 7,401,980 B2 * | 7/2008 | Krauss | F01D 25/168 384/112 |
| 8,317,400 B2 * | 11/2012 | Petitjean | F01D 25/166 29/898.041 |
| 8,408,802 B2 | 4/2013 | Zeidan | |
| 8,657,498 B2 | 2/2014 | Cooley et al. | |

(Continued)

FOREIGN PATENT DOCUMENTS

WO 2015071078 A1 5/2015

*Primary Examiner* — Thomas R. Hannon
(74) *Attorney, Agent, or Firm* — Young Basile Hanlon & MacFarlane P.C.

(57) ABSTRACT

A thrust bearing for a turbocharger includes a bearing body having a bearing surface extending parallel to a collar of a rotating shaft. The bearing body defines a central bore through which the rotating shaft extends. The thrust bearing includes tapered lands formed in the bearing surface at spaced arcuate locations extending radially outward of the second bore. Each tapered land includes a first ramp extending from within the bearing body to the bearing surface along a gradient, a flat extending from the first ramp along the bearing surface, and a second ramp extending from the flat into the bearing body along the gradient. Rotation of the shaft and the collar in either direction equally pressurizes a working fluid between the collar and the bearing surface.

20 Claims, 4 Drawing Sheets

(56) References Cited

U.S. PATENT DOCUMENTS

| | | | |
|---|---|---|---|
| 8,764,377 B2* | 7/2014 | Frankenstein | F01D 25/168 415/104 |
| 2011/0206549 A1 | 8/2011 | Buell | |
| 2014/0044540 A1* | 2/2014 | Uneura | F04D 29/057 415/229 |
| 2015/0055898 A1* | 2/2015 | Kayser | F16C 17/04 384/123 |
| 2015/0131931 A1* | 5/2015 | Duecker-Schulz | F16C 17/045 384/121 |
| 2015/0240828 A1 | 8/2015 | Hunt | |

* cited by examiner

BI-ROTATIONAL THRUST BEARING FOR A TURBOCHARGER

BACKGROUND

In the field of internal combustion engines, turbochargers are forced-induction devices that are used to increase the pressure of the intake air provided to the engine. Increasing the intake air pressure can produce an increased power output relative to a naturally-aspirated engine.

In operation, exhaust gases from the engine are routed to the turbocharger and are used to drive a turbine wheel. The rotational force generated by the turbine wheel is used to drive a compressor wheel, thereby pressurizing ambient intake air and supplying the pressurized intake air to the engine. By pressurizing the intake air, the amount of air and fuel that can be forced into each cylinder during an intake stroke of the engine is increased.

Turbochargers have a variable distribution of air pressure on opposite sides of the compressor wheel and the turbine wheel that can affect the operation of the turbocharger. A thrust bearing is used to absorb the axial portion of the load created by the air pressure, thereby ensuring reliable operation of the turbocharger.

SUMMARY

One aspect of the disclosed embodiments is a thrust bearing. The thrust bearing includes a bearing body having a bearing surface and defining a bore. The thrust bearing also includes tapered lands formed in the bearing surface at spaced arcuate locations extending radially outward of the bore. Each tapered land includes a first ramp extending from within the bearing body to the bearing surface along a gradient, a flat extending from the first ramp along the bearing surface, and a second ramp extending from the flat into the bearing body along the gradient.

Another aspect of the disclosed embodiments is a turbocharger. The turbocharger includes a bearing housing defining a first bore, a shaft including a shaft body extending through and rotatable within the first bore and a collar extending perpendicularly from the shaft body, and a thrust bearing extending across the first bore. The thrust bearing includes a bearing body having a bearing surface extending parallel to the collar and defining a second bore through which the shaft body extends. The thrust bearing also includes tapered lands formed in the bearing surface at spaced arcuate locations extending radially outward of the second bore. Each tapered land includes a first ramp extending from within the bearing body to the bearing surface along a gradient, a flat extending from the first ramp along the bearing surface, and a second ramp extending from the flat into the bearing body along the gradient. Rotation of the collar in either direction equally pressurizes a working fluid between the collar and the bearing surface.

Another aspect of the disclosed embodiments is a turbocharger. The turbocharger includes a bearing housing defining a first bore, a shaft including a shaft body extending through and rotatable within the first bore and a collar extending perpendicularly from an axis of rotation of the shaft body, and a thrust bearing extending across the first bore. The thrust bearing includes a bearing body having a bearing surface extending parallel to the collar and defining a second bore through which the shaft body extends. The thrust bearing also includes tapered lands formed in the bearing surface at spaced arcuate locations extending radially outward of the second bore. Each tapered land includes a first ramp extending from within the bearing body to the bearing surface along a gradient, a flat extending from the first ramp along the bearing surface, and a second ramp extending from the flat into the bearing body along the gradient. The length of the first ramp can be equal to a length of the second ramp to ensure equal performance in either rotational direction. The gradient can have a fixed slope. The thrust bearing also includes lubricant grooves formed in the bearing surface between adjacent tapered lands. Rotation of the collar in either direction equally pressurizes a working fluid between the collar and the bearing surface.

BRIEF DESCRIPTION OF THE DRAWINGS

The description herein makes reference to the accompanying drawings, wherein like referenced numerals refer to like parts throughout several views.

DETAILED DESCRIPTION

The disclosure is directed to thrust bearings for use in absorbing axial thrust loads in a turbocharger. A bi-rotational thrust bearing is described that can achieve equal performance for both clockwise and counterclockwise directions of shaft rotation within a turbocharger. The bi-rotational thrust bearing can include tapered lands formed on a bearing surface at spaced, arcuate locations extending radially outward of a central bore. The tapered lands can include first ramps that extend from within a stationary, non-rotating bearing body to the bearing surface along a gradient, flats that extend along the bearing surface, and second ramps that extend into the bearing body along the same gradient.

Hydrodynamic pressure is generated as oil flows up the first ramp and is compressed between the flats extending along the bearing surface and a collar extending from a rotating shaft. The collar includes a rotating surface extending parallel to the flats. This hydrodynamic pressure is sufficient to counteract the axial forces placed on the rotating shaft by operation of the turbocharger.

Figure 1:
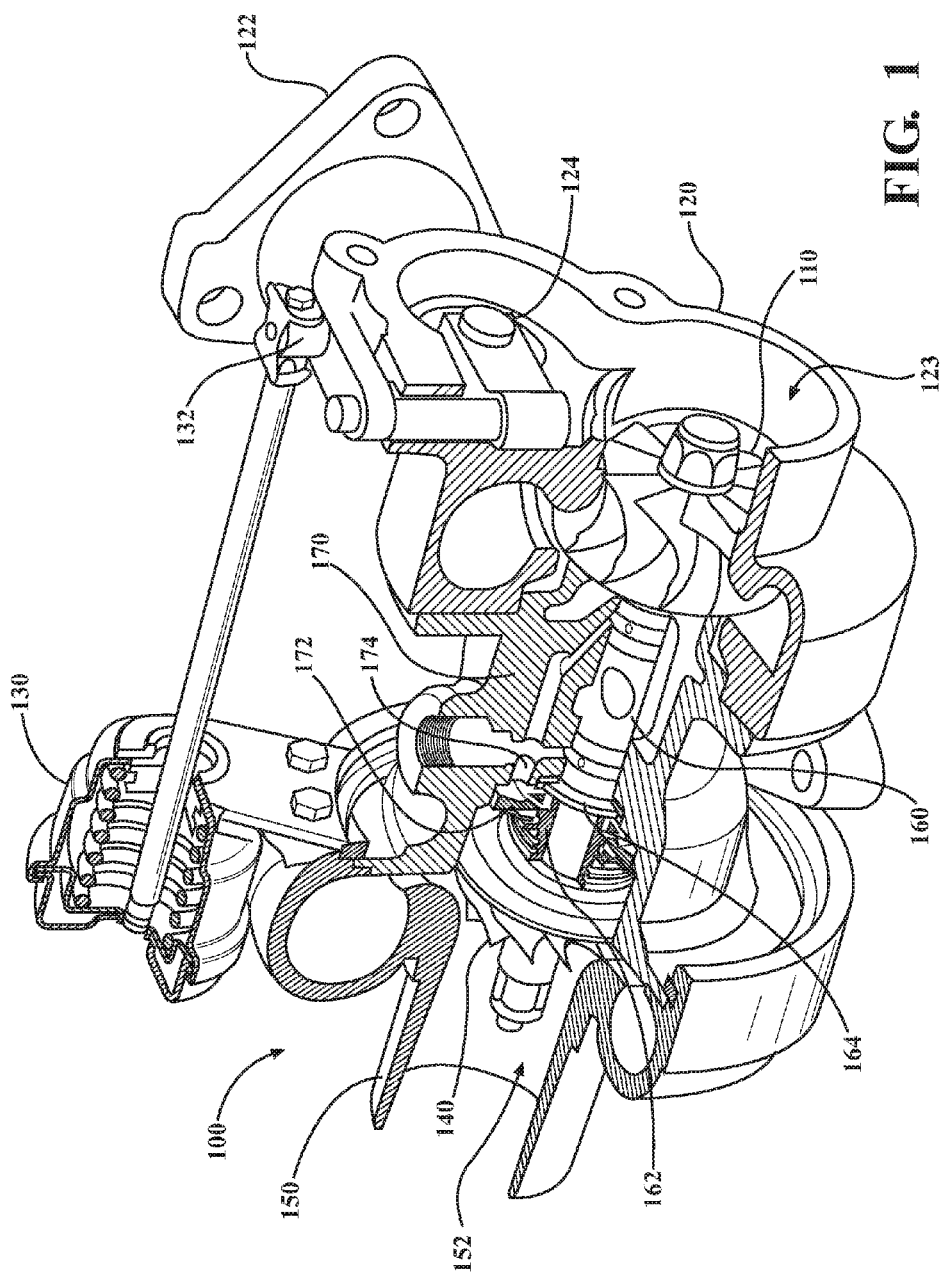
FIG. 1 is a perspective partial cross-sectional illustration showing a turbocharger.

FIG. 1 shows a conventional turbocharger 100. The turbocharger 100 is an exhaust-gas-driven, forced-induction device used in conjunction with an internal combustion engine (not shown) to increase the power produced by the engine.

The turbocharger 100 includes a turbine wheel 110 located in a turbine housing 120. The turbine housing 120 includes an exhaust gas inlet 122 for receiving exhaust gas from the engine and an exhaust gas outlet 123 for returning exhaust gas to the exhaust circuit (not shown). A wastegate 124 can be mounted within the turbine housing 120 to allow some or all of the exhaust gas to bypass the turbine wheel 110. The wastegate 124 is movable between an open position and a closed position by a control device, such as an actuator 130. A linkage 132 connects the actuator 130 and the wastegate 124.

The turbocharger 100 also includes a compressor wheel 140 located in a compressor housing 150. The compressor housing 150 includes an intake air inlet 152 and an intake air outlet (not shown). Intake air is routed from the intake air inlet 152 to the compressor wheel 140, where the intake air is pressurized by rotation of the compressor wheel 140. The intake air then exits the compressor housing 150 at the intake air outlet before being supplied to the engine.

Rotation of the compressor wheel 140 is driven by rotation of the turbine wheel 110. In particular, the turbine wheel 110 and the compressor wheel 140 are connected by a shaft 160. The shaft 160 can be a substantially rigid member, and the turbine wheel 110 and the compressor wheel 140 can be fixedly connected to the shaft 160 in a manner that prevents rotation of the turbine wheel 110 and the compressor wheel 140 with respect to the shaft 160. As a result, the compressor wheel 140 can rotate in unison with the turbine wheel 110 in response to rotation of the turbine wheel 110.

The shaft 160 is supported within a bearing housing 170 such that the shaft 160 freely rotates with respect to the bearing housing 170 at a very high rotational speed. The bearing housing 170, the turbine housing 120, and the compressor housing 150 are all arranged along an axis of rotation of the shaft 160. In this example, the bearing housing 170 is positioned between the turbine housing 120 and the compressor housing 150, with a first end of the bearing housing 170 connected to the turbine housing 120 and a second end of the bearing housing 170 connected to the compressor housing 150. Other types of connections between the turbine wheel 110 and the compressor wheel 140 are also possible.

The turbocharger 100 also includes a thrust bearing 172 supported within the bearing housing 170 and designed to counteract axial forces acting on the compressor wheel 140 and the turbine wheel 110. The thrust bearing 172 includes opposing and generally annular flat bearing surfaces (not shown) disposed between a pair of flat or plate-like collars 162, 164 extending perpendicularly from the rotating shaft 160. That is, each bearing surface extends both adjacent to and generally parallel to one of the collars 162, 164. The thrust bearing 172 operates to combat axial forces in two directions along the shaft 160, towards the compressor wheel 140 or towards the turbine wheel 110, through axial displacement between the collars 162, 164 enabled by pressurization of a working fluid, such as oil, present within lubricant grooves (not shown). The working fluid enters the lubricant grooves from a fluid supply port 174, forms a fluid film between the thrust bearing 172 and the collars 162, 164 on the rotating shaft 160, and exits a fluid outlet (not shown). Various thrust bearings configured to act in place of the thrust bearing 172 are described further below.

Figure 2A:
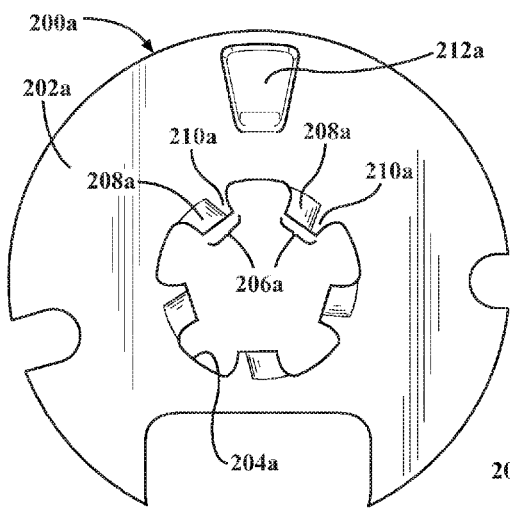
FIGS. 2A and 2B are top-view illustrations showing prior-art thrust bearings for use with the turbocharger of FIG. 1.
Figure 2B:
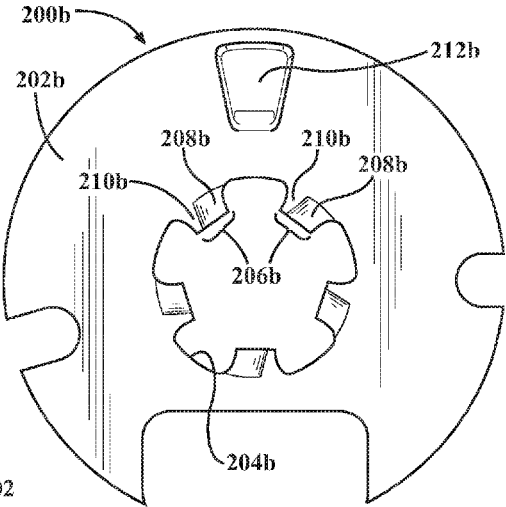

FIGS. 2A and 2B are top-view illustrations showing prior-art, tapered-land thrust bearings 200a, 200b for use with the turbocharger 100 of FIG. 1. The thrust bearings 200a, 200b have generally flat bearing surfaces 202a, 202b that define central bores 204a, 204b. Multiple tapered lands 206a, 206b are formed on the bearing surfaces 202a, 202b at spaced, arcuate locations extending radially outward of the bores 204a, 204b. The tapered lands 206a, 206b include ramps 208a, 208b that extend along gradients and flats 210a, 210b that are generally coextensive with the bearing surfaces 202a, 202b.

The ramps 208a, 208b are designed to taper the further the ramps 208a, 208b extend from the flats 210a, 210b. In other words, the overall thickness of the thrust bearings 200a, 200b decreases with the taper of the ramps 208a, 208b. The ramps 208a of the tapered lands 206a extend from the left side of the flats 210a, whereas the ramps 208b of the tapered lands 206b extend from the right side of the flats 210b in the top-view illustrations of FIGS. 2A and 2B. Though only one of the bearing surfaces 202a, 202b is shown for each of the thrust bearings 200a, 200b, opposing surfaces (not shown) can be of a similar design allowing the thrust bearings 200a, 200b to interact with both of the collars 162, 164 of the shaft 160.

The thrust bearings 200a, 200b include lubricant grooves 212a, 212b positioned radially outward from the tapered lands 206a, 206b. The lubricant grooves 212a, 212b are configured to receive oil from, for example, the fluid supply port 174 shown in the bearing housing 170 of FIG. 1. In these prior-art, tapered-land thrust bearings 200a, 200b, a thrust load is absorbed by a film of high pressure oil that forms between the tapered lands 206a, 206b on the bearing surfaces 202a, 202b and the collars 162, 164 that extend from the shaft 160 of FIG. 1 when the collars 162, 164 are both positioned immediately adjacent to the bearing surfaces 202a, 202b and rotate with respect to the bearing surfaces 202a, 202b.

Oil is drawn between the collars 162, 164 and the bearing surfaces 202a, 202b by the rotation of the shaft 160 to form a high-pressure oil film. Each of the thrust bearings 200a, 200b is designed for a single direction of rotation of the shaft 160 and the collars 162, 164 such that rotation of the shaft 160 in that specific direction (either clockwise or counterclockwise) causes oil to flow up each of the ramps 208a, 208b and across each of the flats 210a, 210b. Oil pressure increases as the oil is compressed between the bearing surfaces 202a, 202b and the collars 162, 164 because of the diminishing clearance formed by the wedge-shaped ramps 208a, 208b. The increased oil pressure can act on the bearing surfaces 202a, 202b to counteract axial forces placed on the shaft 160 by operation of the turbocharger 100 or vehicle components (not shown).

Figure 3:
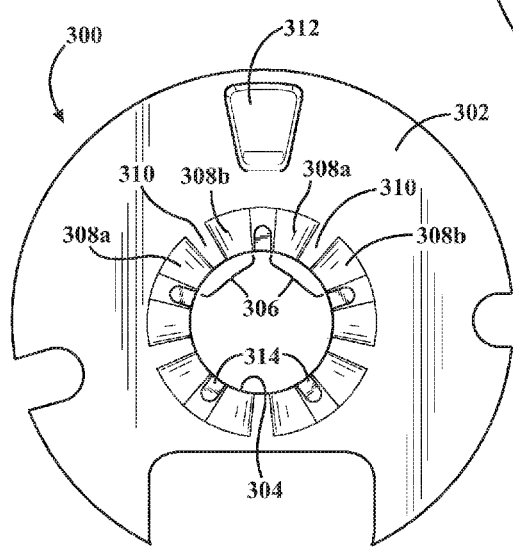
FIG. 3 is a top-view illustration showing another thrust bearing for use with the turbocharger of FIG. 1.

FIG. 3 is a top-view illustration showing an improved thrust bearing 300 for use with the turbocharger 100 of FIG. 1. The thrust bearing 300 has a generally flat bearing surface 302 that defines a central bore 304. Multiple tapered lands 306 are formed on the bearing surface 302 at spaced, arcuate locations extending radially outward of the bore 304. The tapered lands 306 include first ramps 308a that extend from within the bearing body to the bearing surface 302 along a gradient, flats 310 that extend from the first ramps 308a and are generally coextensive with the bearing surface 302, and second ramps 308b that extend from the flats 310 into the bearing body along the gradient. Though only one bearing surface 302 is shown for the thrust bearing 300, an opposing surface (not shown) can be of a similar design allowing the thrust bearing 300 to interact with both of the collars 162, 164 of the shaft 160.

The ramps 308a, 308b are designed to taper the further the ramps 308a, 308b extend from the flats 310, and the overall thickness of the thrust bearing 300 decreases with the taper along the ramps 308a, 308b. Though a radial width of the ramps 308a, 308b is shown as uniform in FIG. 3, the radial width of the ramps 308a, 308b may vary in the radial direction in a manner similar to the radial width of the ramps 208a, 208b of FIG. 2. Unlike the thrust bearings 200a, 200b of FIG. 2, the thrust bearing 300 of FIG. 3 is bi-rotational in that performance of the thrust bearing 300 is the same regardless of the direction of rotation of the shaft 160 of FIG. 1. The bi-rotational design for the thrust bearing 300 allows the thrust bearing 300 to be used with turbochargers, such as the turbocharger 100, designed for either clockwise or counterclockwise rotation of the shaft 160, reducing the production complexity for these turbochargers.

The thrust bearing 300 includes a first lubricant groove 312 positioned radially outward from the tapered lands 306. The first lubricant groove 312 is configured to receive oil from the fluid supply port 174 shown in the bearing housing 170 of FIG. 1. The thrust bearing 300 also includes second lubricant grooves 314 that extend between adjacent tapered lands 306. The second lubricant grooves 314 can supply oil to and/or carry oil radially along the bearing surface 302. The second lubricant grooves 314 allow for relief of oil pressure between the tapered lands 306. Though the second lubricant grooves 314 in FIG. 3 are shown as having a generally rectangular cross section, other cross sections are also possible.

In operation, oil can be drawn between the collars 162, 164 of the shaft 160 and the bearing surface(s) 302 by the rotation of the shaft 160 to form a high-pressure oil film. In one example, oil can be drawn up each of the first ramps 308a and across each of the flats 310 generating hydrodynamic pressure as the oil is compressed between the bearing surface(s) 302 and the collars 162, 164 based on the diminishing clearance formed by the wedge-shaped ramps 308a. At the same time, oil flows down each of the second ramps 308b and into the second lubricant grooves 314, mixing working oil with supply oil to control oil temperatures. The arcuate length of the ramps 308a, 308b is designed such that the hydrodynamic pressure generated on the bearing surface (s) 302 is able to counteract the axial forces placed on the shaft 160 by operation of the turbocharger 100 or vehicle components. Further, the arcuate length of the first ramp 308a is the same as the arcuate length of the second ramp 308b, allowing for equal performance in either rotational direction.

Figure 4A:
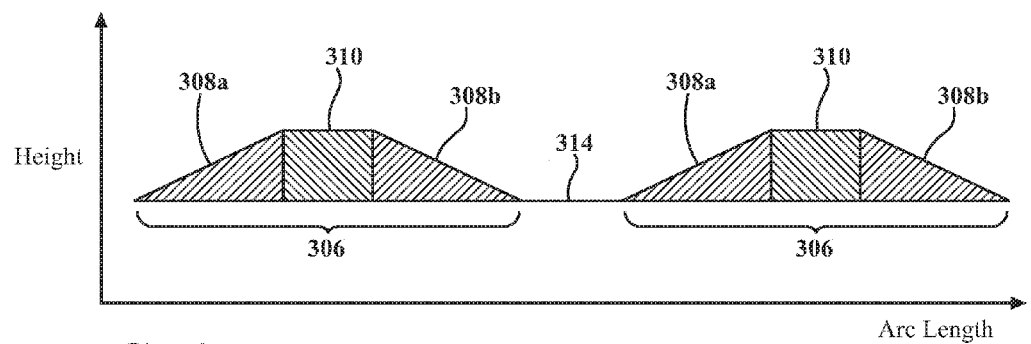
FIGS. 4A-4C are arc-length illustrations showing a variety of ramp-flat geometries for the thrust bearing of FIG. 3.
Figure 4B:
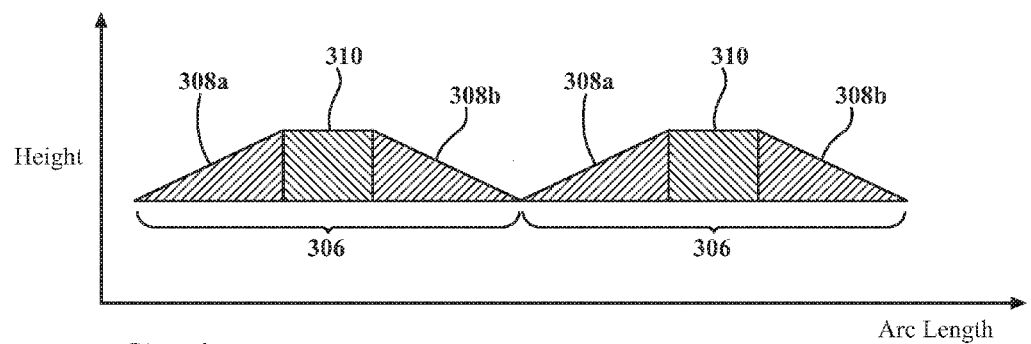
Figure 4C:
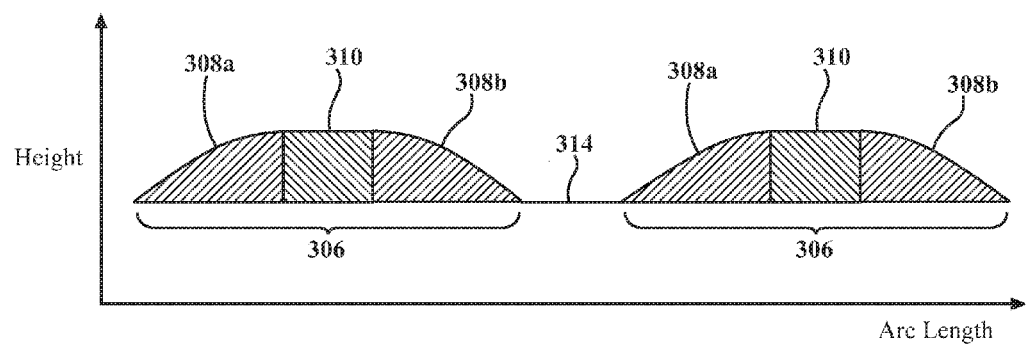

FIGS. 4A-4C are arc-length illustrations showing a variety of ramp-flat geometries for the thrust bearing 300 of FIG. 3. The x-axis in each of the illustrations represents an arc length around the bore 304 of the thrust bearing 300. The y-axis in each of the illustrations represents the height of each of the tapered lands 306, for example, as extending into and out of a body of the thrust bearing 300. The height of each of the tapered lands 306 in FIGS. 4A-4C is exaggerated in order to better describe the ramps 308a, 308b.

In FIG. 4A, the tapered lands 306, only two of which are shown, are formed by the first ramps 308a that have a gradient following a fixed slope extending out of the body of the thrust bearing 300, the flats 310 that have a generally flat surface following the bearing surface 302, and the second ramps 308b that have a gradient following a negative of the fixed slope while extending into the body of the thrust bearing 300. In other words, the gradients are equal for the ramps 308a, 308b while the fixed slopes are opposite in sign, i.e. positive and negative. One lubricant groove 314 is shown as positioned between adjacent tapered lands 306.

In FIG. 4B, the tapered lands 306, only two of which are shown, are formed by the first ramps 308a having a gradient following a fixed slope extending out of the body of the thrust bearing 300, the flats 310 having a generally flat surface following the bearing surface 302, and the second ramps 308b having a gradient following a negative of the fixed slope while extending into the body of the thrust bearing 300. In this example, no lubricant grooves 314 are present, and the thinnest portion of the first ramps 308a is immediately adjacent to the thinnest portion of the second ramps 308b. When the thrust bearing 300 includes the ramp-flat geometry of FIG. 4B, oil is supplied by the first lubricant groove 312 as described with respect to FIG. 3. The ramps 308a, 308b of FIGS. 4A and 4B can have a variety of fixed lengths and fixed slopes to allow for a different number of tapered lands 306 to be present around the bore 304 of the thrust bearing 300.

In FIG. 4C, the tapered lands 306, only two of which are shown, are formed by the first ramps 308a having a gradient following a positive, decreasing slope extending out of a body of the thrust bearing 300, the flats 310 having a generally flat surface following the bearing surface 302, and the second ramps 308b having a gradient following a negative, increasing slope while extending into the body of the thrust bearing 300.

In FIG. 4C, the slope of the gradient is shown as decreasing as the ramps 308a, 308b extend up to the flats 310 and increasing as the ramps 308a, 308b extend down to the lubricant grooves 314. In other words, the ramps 308a, 308b have mirrored, convex surfaces. Alternatively, the slope of the gradient can be increasing as the first ramps 308a extend out of the body and decreasing as the second ramps 308b extend into the body, creating mirrored, concave surfaces (not shown) for the ramps 308a, 308b. Different values for the increasing or decreasing slope of the gradient in FIG. 4C can result in differences in compressive and friction properties of the thrust bearing 300. Additionally, the gradients can include inflection points (not shown) where the curvature, for example, switches between convex and concave shapes. The exact curvature chosen for surfaces of the ramps 308a, 308b will depend on the performance requirements of the thrust bearing 300.

Figure 5A:
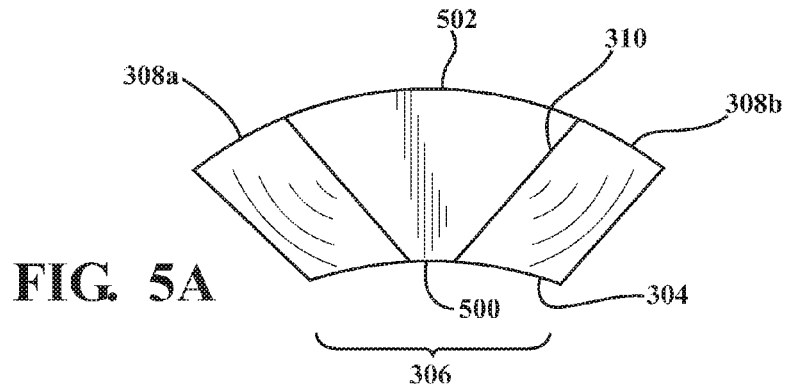
FIGS. 5A-5C are top-view, radial-segment illustrations showing a variety of ramp-flat geometry segments for the tapered lands of the thrust bearing of FIG. 3.
Figure 5B:
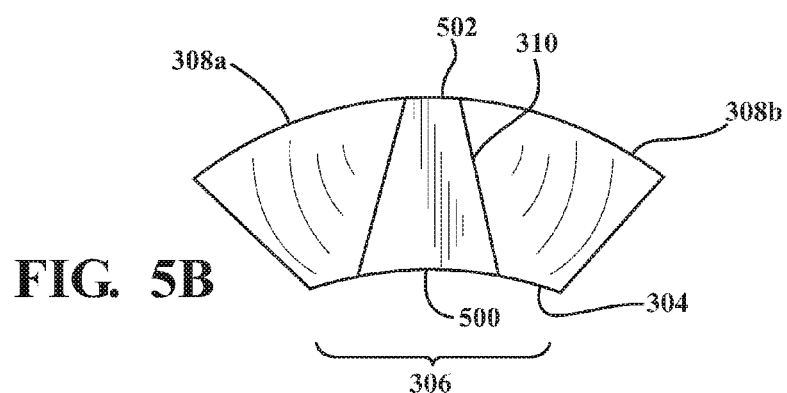
Figure 5C:
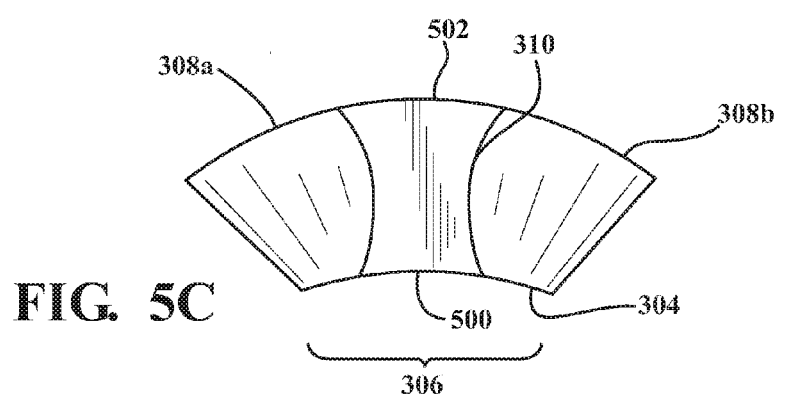

FIGS. 5A-5C are top-view, radial-segment illustrations showing a variety of ramp-flat geometries for the tapered lands 306 of the thrust bearing 300 of FIG. 3. Each tapered land 306 includes a first ramp 308a, a flat 310, and a second ramp 308b as shown. The location of the bore 304 in reference to the tapered land 306 is also shown. No lubricant grooves 314 are represented in FIGS. 5A-5C, but it is understood that lubricant grooves 314 can be present between, for example, adjacent tapered lands 306 as shown in FIG. 3.

In FIG. 5A, the tapered land 306 can be designed to leverage increasing tangential speed radially outward of the central bore 304 by designing the shape of the ramps 308a, 308b and the flat 310 such that the flat 310 has an increasing length outward of the central bore 304. In other words, an inner edge 500 of the flat 310 has a shorter arc length than an outer edge 502 of the flat 310 in the FIG. 5A embodiment. The inner edge 500 is shorter, and the outer edge 502 is longer, than would be caused by the difference in radial locations of the inner edge 500 and the outer edge 502 alone. This geometry allows the thrust bearing 300 to make coarser corrections.

In FIG. 5B, the tapered land 306 can be designed to counter increasing tangential speed radially outward of the central bore 304 by designing the shape of the ramps 308a, 308b and the flat 310 such that the flat 310 has a decreasing length outward of the central bore. In other words, the inner edge 500 of the flat 310 has a longer arc length than the outer edge 502 of the flat 310 in the FIG. 5B embodiment. This geometry allows the thrust bearing 300 to make finer corrections.

In FIG. 5C, the tapered land 306 includes a configuration for the ramps 308a, 308b and the flat 310 designed to create a larger average pressure, with the inner edge 500 and the outer edge 502 of the flat 310 having a similar length while the sides of the flat 310 have an hourglass shape when viewed from above. In another embodiment (not shown), the sides of the flat 310 could curve outward, creating a circular or barrel shape when viewed from above, the circular or barrel shape of the flat 310 being designed to create a larger peak pressure. Though a variety of top-view shapes for the flat 310 are described here, other shapes are also possible and can be implemented in line with performance requirements of the thrust bearing 300.

Although the modified thrust bearing 300 and tapered lands 306 described above are described in the context of turbocharger applications, persons of skill in the art will recognize that the modified thrust bearing 300 can be applied in any application in which thrust bearings are used. Further, while the disclosure has been made in connection with certain embodiments, it is to be understood that the disclosure is not to be limited to the disclosed embodiments but, on the contrary, is intended to cover various modifications and equivalent arrangements included within the scope of the appended claims.

What is claimed is:

1. A thrust bearing, comprising:
   a bearing body including a bearing surface and defining a bore; and
   tapered lands formed in the bearing surface at spaced arcuate locations extending radially outward of the bore, each tapered land comprising:
      a first ramp extending from within the bearing body to the bearing surface along a gradient; and
      a second ramp extending into the bearing body along the gradient,
   wherein a first tapered land is adjacent to a second tapered land, wherein a thinnest portion of the first ramp of the first tapered land is adjacent to a thinnest portion of the second ramp of the second tapered land.

2. The thrust bearing of claim 1, each tapered land further comprising:
   a flat extending from the first ramp and the second ramp along the bearing surface, wherein an arcuate length of a radially inner edge of the flat is longer than an arcuate length of a radially outer edge of the flat.

3. The thrust bearing of claim 1, wherein an arcuate length of each first ramp is equal to an arcuate length of each second ramp.

4. The thrust bearing of claim 1, wherein the gradient has a fixed slope.

5. The thrust bearing of claim 1, wherein the gradient has a decreasing slope or an increasing slope from within the bearing body to the bearing surface.

6. The thrust bearing of claim 1, wherein the bearing surface is a first bearing surface, the thrust bearing further comprising:
   a second bearing surface on the bearing body opposing the first bearing surface and defining the bore; and
   tapered lands formed in the second bearing surface at spaced arcuate locations extending radially outward of the bore, each tapered land comprising:
      a first ramp extending from within the bearing body to the second bearing surface along the gradient; and
      a second ramp extending into the bearing body along the gradient.

7. The thrust bearing of claim 6, wherein each of the first bearing surface and the second bearing surface extends adjacent and parallel to a collar extending from a rotating shaft in a turbocharger.

8. The thrust bearing of claim 1, wherein one of the gradient of the first ramp or the gradient of the second ramp has an increasing slope and the other of the gradient of the first ramp or the gradient of the second ramp has a decreasing slope.

9. The thrust bearing of claim 1, each tapered land further comprising:
   a flat extending from the first ramp and the second ramp along the bearing surface, wherein an arcuate length of a radially inner edge of the flat is longer than an arcuate length of a radially outer edge of the flat.

10. The thrust bearing of claim 1, each tapered land further comprising:
    a flat extending from the first ramp and the second ramp along the bearing surface, wherein an arcuate length of a radially inner edge of the flat is substantially the same as an arcuate length of a radially outer edge of the flat.

11. The thrust bearing of claim 10, wherein sides of the flat have a substantially arcuate configuration between the radially inner edge and the radially outer edge of the flat.

12. A turbocharger, comprising:
    a bearing housing defining a first bore;
    a shaft, comprising:
       a shaft body extending through and rotatable within the first bore; and
       a collar extending perpendicularly from an axis of rotation of the shaft body; and
    a thrust bearing extending across the first bore, comprising:
       a bearing body including a bearing surface extending parallel to the collar and defining a second bore through which the shaft body extends; and
       tapered lands formed in the bearing surface at spaced arcuate locations extending radially outward of the second bore, each tapered land comprising:
          a first ramp extending from within the bearing body to the bearing surface along a gradient;
          a flat extending from the first ramp along the bearing surface, wherein an arcuate length of a radially inner edge of the flat is substantially the same as an arcuate length of a radially outer edge of the flat; and
          a second ramp extending from the flat into the bearing body along the gradient,
       wherein rotation of the collar in either direction equally pressurizes a working fluid between the collar and the bearing surface.

13. The turbocharger of claim 12, the thrust bearing further comprising:
    lubricant grooves formed in the bearing surface between adjacent tapered lands.

14. The turbocharger of claim 12, wherein an arcuate length of each first ramp is equal to an arcuate length of each second ramp.

15. The turbocharger of claim 12, wherein the gradient has a fixed slope.

16. The turbocharger of claim 12, wherein the gradient has a decreasing slope or an increasing slope from within the bearing body to the bearing surface.

17. The turbocharger of claim 12, wherein sides of the flat have a substantially arcuate configuration between the radially inner edge and the radially outer edge of the flat.

18. The turbocharger of claim 12, wherein one of the gradient of the first ramp or the gradient of the second ramp has an increasing slope and the other of the gradient of the first ramp or the gradient of the second ramp has a decreasing slope.

19. A turbocharger, comprising:
a bearing housing defining a first bore;
a shaft, comprising:
- a shaft body extending through and rotatable within the first bore;
- a collar extending perpendicularly from the shaft body; and
- a thrust bearing extending across the first bore, comprising:
  - a bearing body including a bearing surface extending parallel to the collar and defining a defining a second bore through which the shaft body extends; and
  - tapered lands formed in the bearing surface at spaced arcuate locations extending radially outward of the second bore, each tapered land comprising:
    - a first ramp extending from within the bearing body to the bearing surface along a gradient;
    - a flat extending from the first ramp along the bearing surface, wherein an arcuate length of a radially inner edge of the flat is longer than an arcuate length of a radially outer edge of the flat; and
    - a second ramp extending from the flat into the bearing body along the gradient,
  wherein rotation of the collar in either direction equally pressurizes a working fluid between the collar and the bearing surface.

20. The turbocharger of claim 19, wherein one of the gradient of the first ramp or the gradient of the second ramp has an increasing slope and the other of the gradient of the first ramp or the gradient of the second ramp has a decreasing slope.

* * * * *